United States Patent [19]

Kazandjoglou

[11] Patent Number: 4,593,275
[45] Date of Patent: Jun. 3, 1986

[54] SAFETY DEVICE FOR DETECTING A CONDUCTIVE LIQUID

[75] Inventor: Jourdain Kazandjoglou, Alunay /s/ Bois, France

[73] Assignee: Commissariat a l'Energie Atomique, Paris, France

[21] Appl. No.: 520,619

[22] Filed: Aug. 5, 1983

[30] Foreign Application Priority Data

Aug. 5, 1982 [FR] France ............................. 82 13685

[51] Int. Cl.$^4$ ............................................. G08B 21/00
[52] U.S. Cl. .................................. 340/604; 324/65 P; 340/620
[58] Field of Search .............. 340/602, 603, 604, 620; 324/65 P; 73/304 R

[56] References Cited

U.S. PATENT DOCUMENTS

| | | | |
|---|---|---|---|
| 3,465,588 | 9/1969 | Slavin | 73/304 R |
| 3,778,799 | 12/1973 | Bendayan | 340/620 X |
| 3,864,676 | 2/1975 | Macias et al. | 340/604 X |
| 3,970,930 | 7/1976 | Vermolen | 324/98 |
| 4,224,606 | 9/1980 | Bartles | 324/65 P X |
| 4,259,982 | 4/1981 | Bartels | 73/304 R X |
| 4,297,686 | 10/1981 | Tom | 340/604 |

FOREIGN PATENT DOCUMENTS 2197179 3/1974 France .

OTHER PUBLICATIONS

Application Information, vol. 442, Mar. 13, 1968, Eindhoven (NL), "Transistorized Level Sensor", pp. 3–8.

27/Water Detector from ITT Applications; Elektor, Jul./Aug. 1980, pp. 7–22.

Primary Examiner—James L. Rowland
Assistant Examiner—Daniel Myer
Attorney, Agent, or Firm—Kerkam, Stowell, Kondracki & Clarke

[57] ABSTRACT

Safety device used in the detection of a conductive liquid in an enclosure to be monitored, in which the variation of the resistance as a result of the presence of the liquid between electrodes triggers an electrical alarm circuit, wherein it comprises in combination: a liquid detecting member constituted by two spaced electrodes and forming four contacts; a first field effect transistor, whose gate, source and drain terminals are connected to a power supply and to the four aforementioned contacts in such a way that the first field effect transistor is non-conducting when the conductive liquid is absent and where there is no deterioration to any one of the connections connecting the terminals of the first transistor to one or other of the said contacts; and a second field effect transistor, whose source and drain terminals are connected to a second power supply and whose gate terminals are connected to the drain terminal of the first field effect transistor in such a way that the second transistor is conductive under the aforementioned conditions in which the conductive liquid is absent and when there is no deterioration to one of the connections of the circuit, and supplies current to an alarm, signalling and control circuit of an enclosure to be monitored, the respective conduction and non-conduction states of the first and second field effect transistors being reversed when one and/or the other of the aforementioned conditions changes state.

3 Claims, 2 Drawing Figures

SAFETY DEVICE FOR DETECTING A CONDUCTIVE LIQUID

BACKGROUND OF THE INVENTION

The present invention relates to a safety device used in the detection of a conductive liquid in an enclosure to be monitored. It more generally applies to the field of monitoring and inspection of enclosures in which the presence of a liquid is undesirable or unacceptable.

More specifically, the present invention relates to the monitoring and inspection of enclosures in which operations or manipulations are carried out in an uninterrupted manner on products, and without any human supervision.

This is the case, for example in enclosures used in the nuclear industry and called "glove boxes", which are enclosures under a vacuum, within which radioactive products are permanently manipulated by robots and within which there are water circuits in which, for absolute safety reasons, it is vital to be able to immediately detect a leak as soon as it occurs, in order to prevent any contamination.

Hitherto, water leaks in enclosures have been detected by detection devices constituted by two single electrodes having two facing contacts, generally made from carbon, due to the fact that this resists chemical agents such as chlorine vapours, and directly energized from the mains. The electrodes are relatively large and are only relatively safe from the electrical standpoint. When the resistance between the two contacts is modified by the fact that the water to be detected establishes a bridge between them, an alarm and control circuit is triggered. Moreover, these known simple devices have the disadvantage of supplying no information in the case of a deterioration of the actual alarm circuit.

SUMMARY OF THE INVENTION

The object of the present invention is to replace the known simple devices by improved devices able to safely and reliably supply an alarm signal, both in the case of the detection of a conductive liquid, and in the case of an accidental deterioration of one of the elements of an electronic circuit associated with the detection device.

Thus, the present safety device for detecting a conductive liquid in an enclosure to be monitored comprises in combination: a liquid detecting member constituted by two spaced electrodes and forming four contacts; a first field effect transistor, whose gate, source and drain terminals are connected to a power supply and to the four aforementioned contacts in such a way that the first field effect transistor is non-conducting when the conductive liquid is absent and where there is no deterioration to any one of the connections connecting the terminals of the first transistor to one of other of the said contacts; and a second field effect transistor, whose source and drain terminals are connected to a second power supply and whose gate terminals are connected to the drain terminal of the first field effect transistor, in such a way that the second transistor is conducive under the aforementioned conditions in which the conductive liquid is absent and when there is no deterioration to one of the connections of the circuit, and supplies current to an alarm, signalling and control circuit of an enclosure to be monitored, the respective conduction and non-conduction states of the first and second field effect transistors being reversed when one and/or the other of the aforementioned conditions changes state.

According to a preferred embodiment of the invention, the device comprises several liquid detecting members connected, via an OR circuit, to the first and second field effect transistors.

According to another preferred embodiment of the invention, the two electrodes are U-shaped, the two facing parallel branches of the two electrodes being spaced from one another by a distance of approximately 5 mm, and the electrodes are made from stainless steel.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 2:
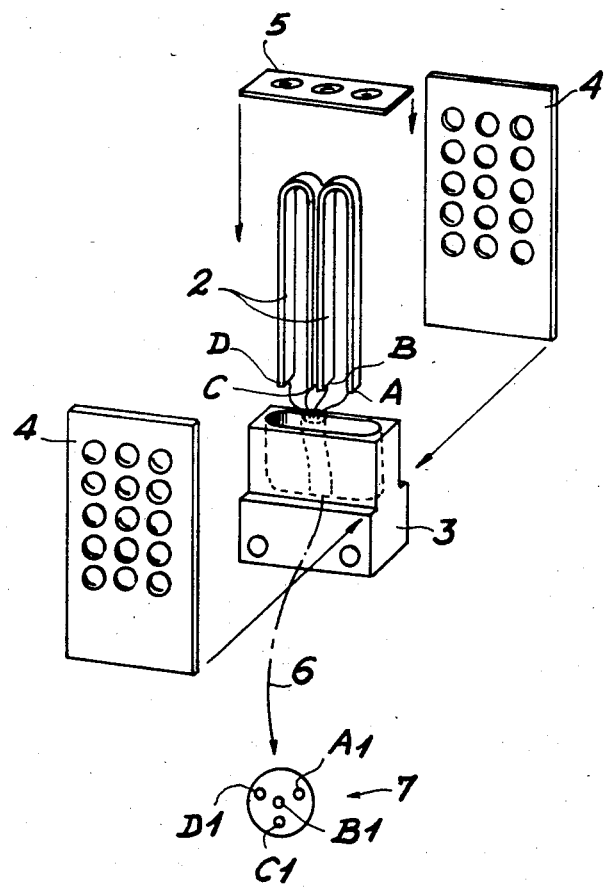
FIG. 2 an exploded perspective view of the electrodes used in this device.

The member for detecting the conductive liquid e.g. water, is diagrammatically shown within the dotted line frame 1. As can be gathered from FIG. 2, it is constituted by two U-shaped electrodes 2, made from stainless steel in order to have minimum dimensions and which are optionally covered by a thin carbon layer in order to resist corrosion.

The two closest parallel branches of the two electrodes have a limited spacing from one another, e.g. approximately 5 to 7 mm, so that, after triggering an alarm following the establishment of a liquid bridge between these two electrodes and the restoration of the normal operating state of the installation, it is possible to eliminate this liquid bridge by manual agitation of the detector means. The two electrodes are terminated by four contacts A, B, C and D.

Electrodes 2 are plugged into an insulating support base 3, to which are fixed by any appropriate means perforated side plates 4 and end plates 5. The closed assembly forms a detection box, which can be flooded as a result of its perforations.

The electrical output is ensured by a cable 6 having four conductive wires respectively connected to four contacts A, B, C and D. Cable 6 is terminated by a plug 7 having four pins $A_1$, $B_1$, $C_1$ and $D_1$.

Figure 1:
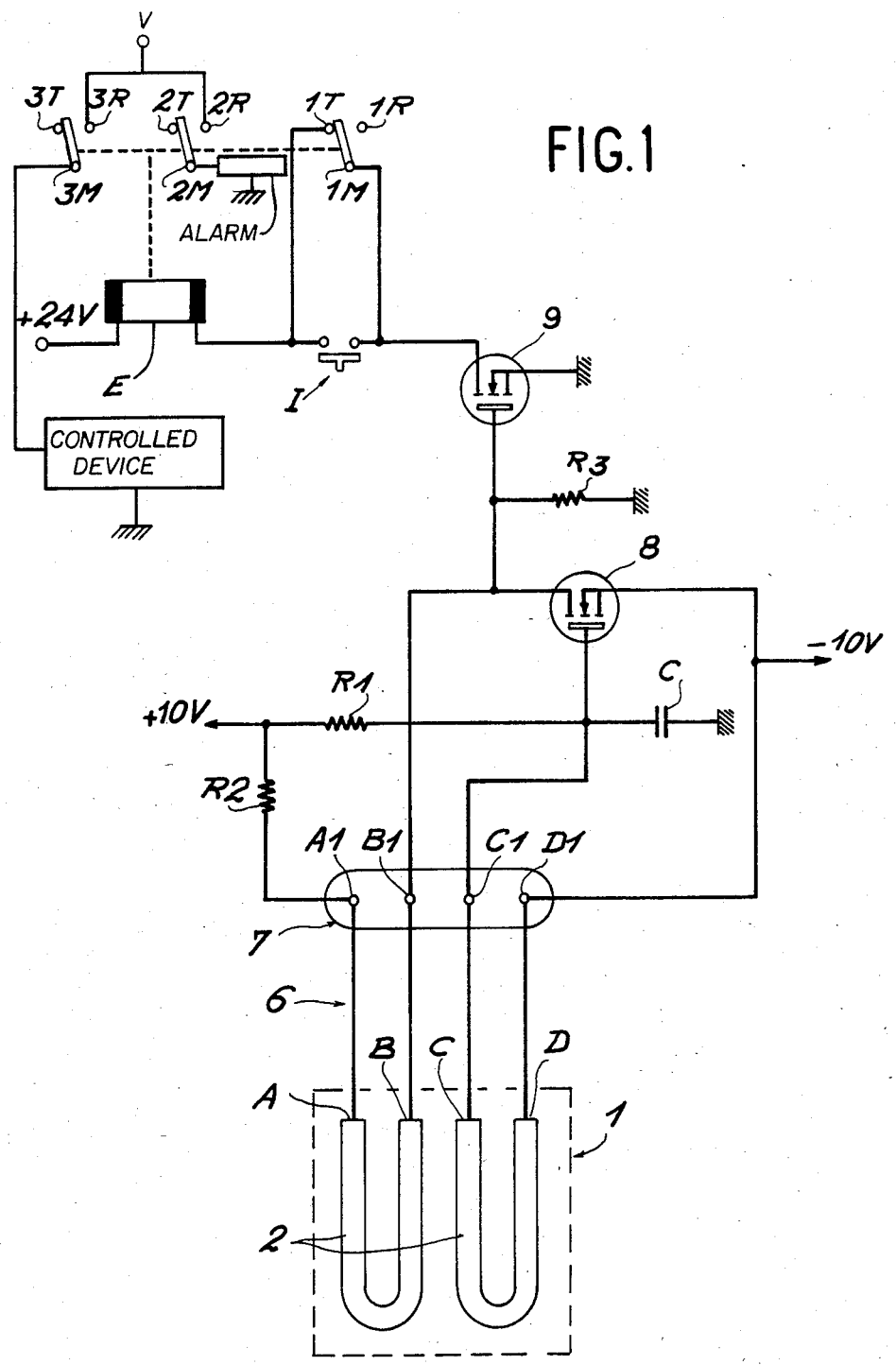
FIG. 1 the electronic diagram of the device.

In the diagram of FIG. 1, the same references are used for designating the same elements of the device.

The electrical resistance of electrodes 2 is substantially zero. However, in the absence of a conductive liquid between these electrodes, the electrical resistance between two spaced electrodes 2 is very high.

A first transistor B, of the MOSFET or FET type, as marketed under reference VN 66 AK and in the present embodiment of the "n channel" type with a high input impedence of min. 1 megohm has its source connected to the $-10$ V terminal of a conventional power supply and to the contact $D_1$, its gate connected, via an anti-interference capacitor C with a value of approximately 1 $\mu$f to earth and also to contact $C_1$ and to the $+10$ V terminal, via a resistor $R_1$ having a value of approximately 100 k $\Omega$, said $+10$ V terminal also being connected via a resistor $R_2$ with a value of approximately 100 k $\Omega$ to contact $A_1$, whilst its drain is to contact $B_1$.

This electrical connection is such that, when there is no conductive liquid between electrodes 2 and when all the aforementioned connections are effectively established, the field effect transistor 8 is non-conducting.

The electronic circuit also uses a second transistor 9, which is also of the MOSFET or FET type and as marketed under reference VN 66 AJ, which in the present embodiment is of the "channel n" type. The source of this transistor is connected to earth. Its gate is connected to the drain of transistor 8 and also, across a resistor $R_3$ with a value of approximately 1M $\Omega$ to earth. The drain of transistor 9 is connected across an interrupter I in series with winding E of an alarm relay, to the +24 V terminal of a conventional power supply. The relay controls a certain number of contacts 1M (with rest position 1R and working position 1T), 2M (with rest position 2R and working position 2T), 3M (with rest position 3R and working position 3T), etc. corresponding to the different control functions which are to be fulfilled: self-holding of the relay, alarms, control of a random member such as the water supply valve, etc.

Under the conditions enumerated hereinbefore, i.e. no conductive liquid between the electrodes and a satisfactory state of the connections of the electronic circuit, transistor 8 is non-conducting and transistor 9 conducting, thus energizing winding E of the alarm relay. As shown, contacts 1M, 2M, 3M, etc. are in the working positions 1T, 2T, 3T, etc.

However, as soon as one of the conditions changes state, transistor 8 becomes conducting and consequently blocks the other transistor 9, which corresponds to the triggering of an alarm, so that contacts 1M, 2M, 3M, etc. return to the rest positions 1R, 2R, 3R, etc.

Once the normal operating condition has been reestablished, the alarm is suppressed by actuating the normally open interrupter I, which then closes on reestablishing the power supply to the alarm relay.

The above description of a specific embodiment of the invention in no way limits the latter. In particular, the electrical values given for the different components of the electronic circuit (resistors - capacitor) can vary by ±20%.

In the same way, it is also possible to use transistors of the same type, but with a "p channel" provided that there is a resulting modification to the polarizations of the power supplies to the terminals of these transistors.

The characteristic feature of the invention is the special construction of the conductive liquid detection electrodes and the special connection of their four contacts to specific electronics having two field effect transistors.

It is finally pointed out that it is obviously possible to connect only one such electronics, via an OR circuit, to several groups of conductive liquid detection electrode pairs.

What is claimed is:

1. A safety device used in the detection of a conductive liquid in an enclosure to be monitored, in which the variation of the resistance as a result of the presence of the liquid between electrodes triggers an electrical alarm circuit, wherein it comprises in combination: a liquid detecting member constituted by two spaced electrodes and forming four contacts; a first field effect transistor, whose gate, source and drain terminals are connected to a power supply and to the four aforementioned contacts in such a way that the first field effect transistor is non-conducting when the conductive liquid is absent and where there is no deterioration to any one of the connections connecting the terminals of the first transistor to the said contacts; and a second field effect transistor, whose source and drain terminals are connected to a second power supply and whose gate terminals are connected to the drain terminal of the first field effect transistor in such a way that the second transistor is conductive under the aforementioned conditions in which the conductive liquid is absent and when there is no deterioration to one of the connections of the circuit, and supplies current to an alarm, signalling and control circuit of an enclosure to be monitored, the respective conduction and non-conduction states of the first and second field effect transistors being reversed when either one of the aforementioned conditions changes state.

2. A device according to claim 1, wherein it comprises several liquid detecting devices connected, via an OR circuit, to the first and second field effect transistors.

3. A device according to claims 1 or 2, wherein the two electrodes are U-shaped, two parallel facing branches of the two electrodes being spaced from one another by approximately 5 mm and wherein the electrodes are made from stainless steel.

* * * * *